No. 622,205. Patented Apr. 4, 1899.
W. H. BURNETT.
CLOSET.
(Application filed Feb. 10, 1898.)
(No Model.)

WITNESS
S. J. Prescott
P. McComb

INVENTOR
W. H. Burnett
BY
Clark Deemer & Co
ATTORNEYS

UNITED STATES PATENT OFFICE.

WILLIAM H. BURNETT, OF POUGHKEEPSIE, NEW YORK.

CLOSET.

SPECIFICATION forming part of Letters Patent No. 622,205, dated April 4, 1899.

Application filed February 10, 1898. Serial No. 669,763. (No model.)

*To all whom it may concern:*

Be it known that I, WILLIAM H. BURNETT, a citizen of the United States, and a resident of Poughkeepsie, county of Dutchess, and State of New York, have invented certain new and useful Improvements in Closets, of which the following is a specification, reference being had to the accompanying drawings, forming a part thereof, in which similar letters of reference indicate corresponding parts.

This invention relates to an improved siphon-closet; and the object thereof is to provide a simple device whereby the action of said closet during the operation of flushing may be more positive and effective than the closets of this type now in use.

The invention will be hereinafter fully described, and specifically set forth in the annexed claims.

Figure 1:
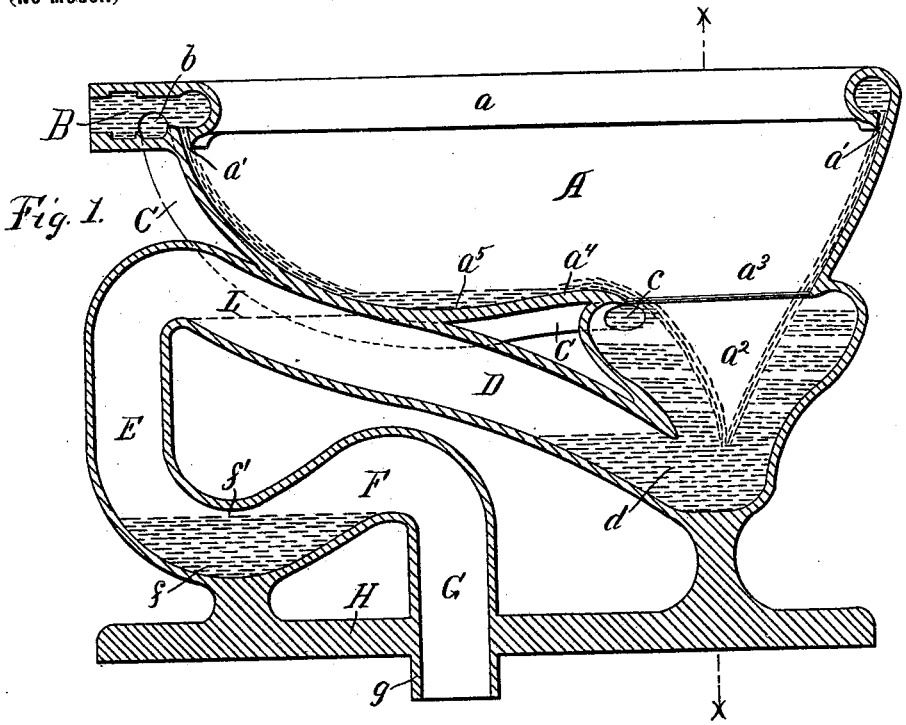
Figure 2:
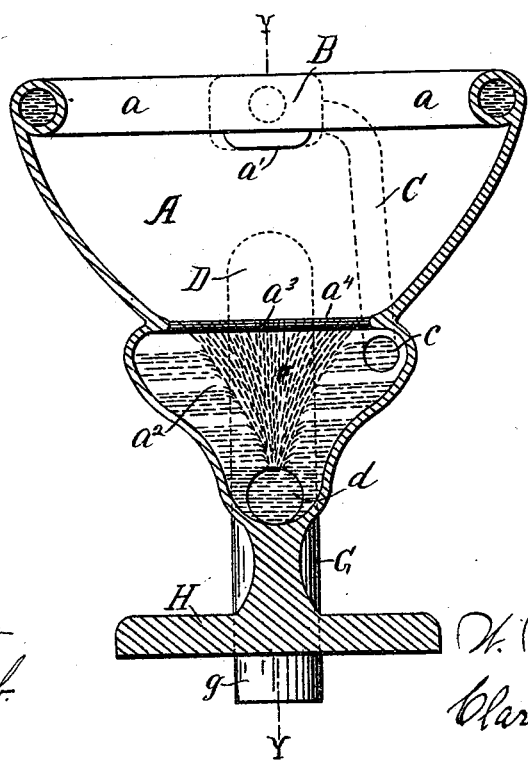

In the accompanying drawings, Figure 1 is a longitudinal sectional elevation on the line $y\ y$ of Fig. 2, and Fig. 2 is a transverse sectional elevation on the line $x\ x$ of Fig. 1.

In the practice of my invention I employ a bowl A, of porcelain or other suitable material, which is provided with a rolled rim $a$. At the rear and forward portions of said rim a slot $a'$ is provided, which communicates between the interior of said rim $a$ and the interior of the bowl A. This opening is preferably approximately three inches in length, and the sides of the rim $a$ are shown closed and offer no communication between the interior thereof and the interior of the bowl A. A chamber B is extended rearwardly from and in the plane of said rim $a$. Said chamber is connected with a source of supply of flushing-water in any approved manner. An opening $b$ communicates between said chamber and the flushing-pipe C, which discharges through the orifice $c$ into the supplementary bowl $a^2$, preferably formed integrally with the bowl A at its forward lower portion.

An orifice $a^3$ affords communication between the bowl A and the supplementary bowl $a^2$. The said supplementary bowl $a^2$ is preferably of the shape shown in the drawings, the object of which will be presently explained.

The orifice $c$ of the flushing-pipe C is located at one side of the supplementary bowl $a^2$, as best shown in Fig. 2. An orifice $d$ at the lower portion of said supplementary bowl affords communication between said bowl and the waste-pipe D, which extends in an inclined direction under the bowl and rearwardly, its rearward portion being at a sufficient elevation to form a trap through the medium of the water at its normal level. (Shown by the dotted line L in Fig. 1.)

A pipe E, preferably formed integrally with the waste-pipe D, extends in a downward direction, thence curves upwardly and forwardly, as at F, and communicates with a vertical discharge-pipe G. An extension $g$ of said pipe G projects below the base-plate H.

The elbow of the pipe formed by the junction of the pipe members E and F is depressed and adapted to retain water of a sufficient depth to almost close the opening $f$ between said members. The object of this formation is to provide a retard of simple construction which cannot clog or foul, the space $f'$ between the top of the pipe at the elbow and the surface of the water contained in said elbow being sufficient to permit the escape of the air at the beginning of the flushing action and at the same time being adapted to be closed by the flushing-water after the air has been expelled, thus preventing breaking of the siphon-column.

The table $a^4$ of the bowl A is provided with a depression $a^5$, which is adapted to retain water after the flushing action, thus keeping the said table always wet.

In the operation of this device and in active or normal condition the water in the elbow of the pipes E and F lies as shown in Fig. 1. In the waste-pipe D, however, the water is at a level with the dotted line L, the pipe being full below that point. As soon, however, as the flushing action begins water flows into the chamber B from the source of supply and thence through the rim $a$ and through the discharging-outlets $a'\ a'$ down the rear and forward sides of the bowl A. That portion of the water which flows down the rearward side of the bowl passes forward over the table, carrying with it the water held in the depression $a^5$ and discharging over the edge of the table into the center of the supplemental bowl $a^2$. The water flowing down the forward side of the bowl meets the above-mentioned stream at a point near the base of said supplemental bowl and opposite the orifice $d$, communicating between said supplemental bowl and the waste-pipe D. At the same time water flows through the orifice $b$ into the flushing-pipe C and thence through the orifice $c$ thereof into the one side of the supplemental bowl $a^2$. Thence it passes around said supplemental bowl in a spiral manner, the converging sides of said supplemental bowl acting to cause the stream of water from the flush-pipe C to meet the converging front and rear streams from the bowl at a point opposite the opening of the water-pipe D. A whirlpool action is thus instantly established, which draws the water from the table and from the forward side of the bowl into its vortex and prevents effectually the return flow of the same. In the meantime, the level of the water in the pipe D having risen, the water flows into the pipes F and G. As soon as the air is expelled the space $f'$ is closed by the water, said water instantly closing the siphon-column, and the water flowing downwardly through the pipes E and G draws the water forced through the orifice $d$ into the waste-pipe D by the whirlpool action in the supplementary bowl through and out of the device into the soil-pipe. As soon as the flushing ceases the air rushes back to the pipes C and F. The water flows to its normal level in the elbow between the pipes E and F, as shown in Fig. 1, and to the level in the pipe D, as shown by dotted line L, and water settles upon the bowl-table to the height represented by broken lines in Fig. 1 of the drawings.

I now think that the whirlpool action induced in the supplementary bowl by the discharge of flushing-water into the side of said bowl from the pipe C is more prompt and effective when front and rear flushing-streams flowing from slots $a'$ $a'$ in the top of the main bowl are met as they converge by the forceful inflow from the pipe C at the side of the supplementary bowl; but the flushing-water inlets may extend entirely around the top of bowl A to flush its entire inner surface, and the water-inlet at C will have sufficient force to induce effective whirlpool action in the supplementary bowl in conjunction with flushing inflow thereto from all sides of the main bowl.

Having thus described my invention, what I claim as new, and desire to secure by Letters Patent, is—

1. A water-closet comprising a main bowl having flushing-water inlet, and a lower communicating supplementary bowl opening to the trap or waste-pipe, and a flushing-pipe discharging at one side of the supplementary bowl and inducing whirlpool action therein facilitating emptying of the closet, substantially as described.

2. A water-closet comprising a main bowl having upper front and rear flushing-water inlets, a lower communicating supplementary bowl opening to the trap or waste-pipe, and a flushing-pipe discharging at one side of the supplementary bowl and inducing whirlpool action therein in conjunction with the converging front and rear flushing-streams from the main bowl thereby facilitating emptying of the closet, substantially as described.

3. A water-closet comprising a main bowl and a lower communicating supplementary bowl, flushing-water inlets being provided at the top of the main bowl and the upper side part of the supplementary bowl, and an outlet from the supplementary bowl to the waste-pipe embodying two traps, substantially as described.

4. A water-closet comprising a main bowl and a lower communicating supplementary bowl, flushing-water inlets being provided at the top of the main bowl and at the upper side part of the supplementary bowl, and an outlet from the supplementary bowl to the waste-pipe embodying two traps, the second trap affording preliminary escape of air and permitting subsequent water-filling of the outlet for effective siphonage of the contents of the closet, substantially as described.

In testimony that I claim the foregoing as my invention I have signed my name, in presence of two witnesses, this 2d day of February, 1898.

WILLIAM H. BURNETT.

Witnesses:
   M. G. McClean,
   B. McComb.